3,427,204
LEACHED AMALGAMATED ZINC ANODE
Richard R. Clune, Ardsley, and Harold Field, Peekskill, N.Y., assignors to P. R. Mallory & Co., Inc., Indianapolis, Ind., a corporation of Delaware
Filed Nov. 14, 1966, Ser. No. 594,174
U.S. Cl. 136—126  4 Claims
Int. Cl. H01m 13/06

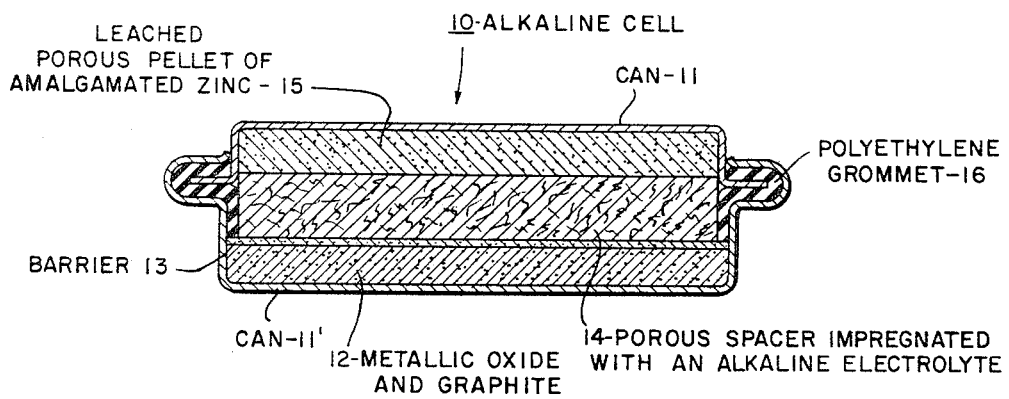

ABSTRACT OF THE DISCLOSURE

A porous amalgamated zinc anode and a method for making the amalgamated zinc anode suitable for use in a current producing cell by reactively cementing an admixture mass of an aliphatic solvent and powders of ammonium chloride, magnesium sulfate, mercurous chloride and zinc to form the amalgamated zinc anode suitable for use in the current producing cell.

---

This invention relates to batteries and more particularly to improved structures and systems therefor, and specifically to the electrodes used therein.

The efficiency of a battery depends to a great extent on the surface area of the anode structure used therein. The present invention provides an anode of greatly improved characteristics comprising compacted porous zinc amalgam, and utilizing ammonium chloride, magnesium sulfate and mercurous chloride to form a uniform pellet by electrochemical reaction cementation.

The reactive cementation process utilizes electrochemical displacement of mercury from the mercurous chloride compound to produce an alloying or amalgam bond between the zinc particles. The added pressure used gives intimate contact between the particles before and during the reaction and affords strength to the compact until adequate amalgam bonding has been accomplished. Ultimately, when the excess materials are leached out, a highly porous zinc amalgam anode with sufficient mechanical strength results.

In providing these novel porous anodes, advantage is taken of the teachings provided in U.S. Ser. No. 460,044, entitled "Addition Agents for Sintering Processes" by Mlarur L. B. Rao, filed June 1, 1965, and wherein electrochemical displacement is used to bring about cementation by chemical corrosion or fluxing and to obtain the metal to metal contact required to produce a uniformly dense and porous structure.

Further, in order to avoid gassing it is necessary to have zinc amalgam over the anode so that the zinc amalgam may coat any impurity sites. Therefore the amount of mercurous chloride has a minimum critical limit and a maximum depending on the strength characteristics of the anode.

It is also found that the brittleness of the porous anode is directly correlated to the mercury content, and therefore it may be desirable to heat treat the anode at about 55° C.

The electrolyte also is critical because of the amount of zinc oxide present. The stability toward gassing increases with the amount of zinc oxide present. Conversely, the low temperature performance varies inversely with the zinc oxide content. Thus, a comprise composition between stability and performance will depend on these parameters.

It is therefore a prime object of the present invention to provide, in a battery, an amalgamated zinc anode of great porosity and uniform density fabricated by reactive cementation and pressure and then leaching the excess materials therefrom.

It is another object of the present invention to provide an improved porous electrode structure for a current producing cell.

It is another object of the invention to provide an anode structure for an electrical device, said structure formed by mixing specific portions of zinc, ammonium chloride, magnesium sulfate and mercurous chloride, then pressure compacting and reactively cementing said portions.

Still another object of the present invention is to provide a primary cell including a zinc amalgam porous anode for a battery.

Another object is to provide a porous sintered pellet, of homogenized and uniform density, formed primarily as a zinc amalgam structure.

Other objects of the invention will become apparent from the description.

The figure of the drawing is a cross-section of the alkaline dry cell of the present invention.

Generally speaking, the present invention provides a new battery system in which the efficiency is greatly enhanced, especially for low temperature usage. This increase in efficiency is among other features due to the presence, in the battery, of a novel anode consisting of porous zinc amalgam and utilizing ammonium chloride, mercurous chloride and magnesium sulfate. The anode is formed as a uniform, porous pellet by means primarily of reactive cementation of the admixed materials.

The extent of the anodic surface is greatly enhanced by the high porosity of the structure thus formed. After the chemical displacement reaction and cementation, excess unused materials are carefully leached away resulting in a highly porous and uniformly dense amalgamated zinc pellet of great surface area.

The anode, moreover, is of much greater porosity and more consistent surface area, affording better electrolytic conductivity and lower impedance, and has a greater ability to hold more electrolyte than anodes priorly available. The preferred pelleted mixture consists primarily of about 55.4% zinc, 37.7% ammonium chloride, 6.9% mercurous chloride, and the rest an aliphatic solvent. The final anode structure has a porosity of about 77%, and consists essentially of about 90% zinc and 10% mercury. As pointed out, supra, variations may take place from the preferred embodiment depending on the proportions of the material used.

This invention enables alkaline cells to function at low temperatures (−30° C.) with up to 85% of their efficiency at normal temperatures. It is an improvement over present pellet, dispersed pellet or wound anode structures, which deliver at best 20% of room temperature performance at −30° C. and over such devices as heaters, frangible vials, antifreezes, etc., employed to obtain low temperature operation. These have added greatly to the complexity of the structure, while decreasing space available for active elements; e.g. depolizer, anode and electrolyte.

In the figure of the drawing, there is shown an alkaline cell, of cylindrical or flat construction, 10 comprising an outer can or cans 11 and 11′, a pressed pellet, a depolarizing element 12 consisting of a metallic oxide such as HgO, $MnO_2$, and $Ag_2O$, containing from 5–25% graphite, a barrier 13 such as "Synpor," "Visking," or "Polyco," an alkaline electrolyte impregnating an absorbent spacer 14 such as "Webril" or "synpor," or combination of these, and a porous zinc amalgam anode 15 of novel construction, described herein.

The leached amalgamated anode of great porosity 15 of the cell is produced as follows:

I. Fabrication and reactive cementation

A. Place 300 gms. of ammonium chloride and 25 gms. of magnesium sulfate into a blender.

B. Introduce 916 gms. of zinc and mix.

C. Introduce .080 gms. (approx. 50 drops) of a non-polar, low volatility substance such as deodorized kerosene. Mix until uniform. The kerosene acts as a coating which prevents premature reaction of the material and as a blending agent to coat the pellets and cohere them in order to prevent stratification and segregation. This step assures uniform blending so that homogenity is obtained in the mix.

D. Introduce 236 gms. of mercurous chloride and mix until uniform.

It is required that all mixing be done at a temperature of 65° F. maximum and at a relative humidity of 40% maximum.

E. The mix is then pelletized at a pressure of about 12,800 lbs. per sq. in.

II. Leaching

A. The pellets are placed in washing trays and are then immersed in a saturated solution of ammonium chloride. The pellets must be soaked for a minimum of one half hour in the saturated solution of ammonium chloride.

B. The pellets are then leached until free of chloride ion. Test to determine an absence of chloride ion by the use of silver nitrate added to the water drippings from the washed pellets.

III. Drying

A. After leaching is completed by showing that all chloride ion is absent from the leaching water, place the anodes in a solution of methanol for about 10 minutes. The methanol is used to dry the anodes.

B. Remove the pellets from methanol and place them in a vacuum oven pre-heated at 100° F. until the pellets are completely dried.

C. The pellets are then stored in a dry atmosphere in a container which is air tight and which may include a desiccant.

The novel low temperature alkaline battery including the highly porous leached amalgamated zinc anode of new and unique construction, as described above, is merely illustrative and is not intended to limit the scope of the invention; which is rather to be determined by the claims hereto appended.

What is claimed is:

1. The method of fabricating a highly porous amalgamated zinc anode for a current producing device comprising the steps of:
    (a) Preparing a uniform mixture of powders of ammonium chloride, magnesium-sulfate, and zinc;
    (b) Introducing an aliphatic solvent to thoroughly blend the powders and to avoid stratification;
    (c) Adding mercurous chloride thereto and thereby preparing for an electrochemical cementation reaction to take place;
    (d) Apply compacting pressure concurrently to the above mixture so as to assure intimate point to point contact between the powder particles and to give good mechanical strength;
    (e) Reactively cementing;
    (f) Leaching all chloride magnesium, ammonium and sulfate ion traces from said formed compact; and
    (g) Drying said compact.

2. The method as in claim 1 and wherein the porous amalgamated zinc anode has a porosity of about 77%, and the anode has final composition of approximately 90% zinc and 10% mercury.

3. The method as in claim 1 wherein the aliphatic solvent is a substance that is non-polar, inert and has low volatility and wherein the drying is accomplished in a preheated oven and by the use of alcohol.

4. The method of fabricating a highly porous amalgamated zinc anode for a current producing device comprising the steps of:
    (a) Mixing 300 gms. of ammonium chloride and 25 gms. of magnesium sulfate;
    (b) Introducing into said blend approximately 916 gms. of zinc and mixing all the materials together;
    (c) Placing about .080 gms. of a deodorized kerosene into the prior mixture so as to obtain homogenity therethrough;
    (d) Adding and mixing 236 gms. of mercurous chloride thereto;
    (e) Compacting said materials at a pressure of about 12,800 lbs./sq. in.;
    (f) Leaching the same with water until all traces of chloride, magnesium, ammonium and sulfate ions are gone and;
    (g) Drying said compact in an oven that is preheated and by the use of methanol.

References Cited

UNITED STATES PATENTS

| | | | |
|---|---|---|---|
| 3,071,638 | 1/1963 | Clark et al. | 136—125 |
| 3,205,097 | 9/1965 | Clune et al. | 136—162 |
| 3,322,535 | 5/1967 | Rao | 75—201 |
| 3,348,976 | 10/1967 | Kelly et al. | 136—125 |

FOREIGN PATENTS 148,397  9/1952  Australia.

WINSTON A. DOUGLAS, *Primary Examiner.*

C. F. LE FEVOUR, *Assistant Examiner.*

U.S. Cl. X.R.

136—30, 102